United States Patent [19]
Hiyoshi et al.

[11] Patent Number: 5,229,189
[45] Date of Patent: Jul. 20, 1993

[54] THERMAL IMAGE TRANSFER RECORDING MEDIUM

[75] Inventors: Yoshihiko Hiyoshi, Shimizu; Tetsuji Kunitake, Numazu; Shigeru Miyajima, Fuji; Yuichi Taka, Numazu; Moriyasu Nagai; Tadafumi Tatewaki, both of Numazu; Youji Ide, Mishima; Nobuyuki Maeda, Susono; Kumi Surizaki, Numazu, all of Japan

[73] Assignee: Ricoh Company, Ltd., Tokyo, Japan

[21] Appl. No.: 727,941

[22] Filed: Jul. 10, 1991

[30] Foreign Application Priority Data

Jul. 11, 1990 [JP] Japan ................. 2-184544
May 29, 1991 [JP] Japan ................. 3-154099

[51] Int. Cl.$^5$ .............................................. B41M 5/26
[52] U.S. Cl. ................................. 428/195; 428/327; 428/412; 428/413; 428/473.5; 428/480; 428/484; 428/488.1; 428/492; 428/500; 428/520; 428/913; 428/914

[58] Field of Search ................. 428/195, 212, 913, 914, 428/327, 330, 206, 484, 488.1, 412, 413, 473.5, 480, 492, 500, 520; 156/234

[56] References Cited

U.S. PATENT DOCUMENTS

5,045,383  9/1991  Maeda et al. ................. 428/195
5,110,389  5/1992  Hiyoshi et al. ................. 428/195

Primary Examiner—Patrick J. Ryan
Assistant Examiner—W. Krynski
Attorney, Agent, or Firm—Oblon, Spivak, McClelland, Maier & Neustadt

[57] ABSTRACT

A thermal image transfer recording medium is composed of a support and a thermofusible ink layer formed thereon, and the thermofusible ink layer contains as the main components a coloring agent, a wax component and a rubber elastomer component which is discontinuously dispersed in the form of layers in the thermofusible ink layer, or is composed of a first ink layer containing a wax component and a rubber elastomer and a second ink layer containing a coloring agent, a wax component and a binder resin, which is overlaid on the first ink layer.

16 Claims, 5 Drawing Sheets

MAGNIFICATION x 4800

FIG. 7

MAGNIFICATION x4800

THERMAL IMAGE TRANSFER RECORDING MEDIUM

BACKGROUND OF THE INVENTION

1. Field of the Invention

The present invention relates to a thermal image transfer recording medium comprising a support and a thermofusible ink layer formed thereon, which is excellent in preservability and printing performance at low temperatures, and more particularly to a thermal image transfer recording medium which is particularly suitable for use as a bar code recording medium, free from the problem of the peeling of the thermofusible ink layer off the support at low temperatures, and capable of yielding clear bar codes when printed in the direction at an angle of 90° with respect to the transporting direction of the recording medium.

2. Discussion of Background

Recently a thermosensitive image transfer recording system using a thermal head is widely used because of the advantages that it is noiseless, the apparatus for use in the system is relatively inexpensive and can be made small in size, the maintenance is easy, and printed images are stable in quality.

Representative examples of thermosensitive image transfer recording media for use with such a thermosensitive image transfer recording system are as follows:

(1) A thermosensitive image transfer recording medium comprising a support and a thermofusible ink layer which comprises a coloring agent and a binder agent and is directly provided on the support.

(2) A thermosensitive image transfer recording medium comprising a support and a two-layered thermofusible ink layer provided on the support, comprising a first ink layer provided on the support side and a second ink layer overlaid on the first ink layer. The first ink layer essentially consists of a wax component, while the second ink layer essentially consists of a coloring agent and a binder agent.

Generally many binder agents for use in the thermofusible ink layer in the thermosensitive image transfer recording medium (1) and for use in the first ink layer of the thermosensitive image transfer recording medium (2) comprise as the main component a wax with low plasticity. Therefore the adhesion of such ink layers with a support, for example, a support made of a resin such as polyethylene terephthalate (PET), which is mostly widely used, is so poor that there is the disadvantage that such thermofusible ink layers easily peel off the support when some mechanical force is applied. This disadvantage is particularly conspicuous when such thermosensitive image transfer recording media are placed at low temperatures, for example, at 5° C., and at low humidities, for example, 10-50% RH.

In an attempt to overcome the above disadvantages of the conventional thermosensitive image transfer recording media, for example, the following methods have been proposed: making the surface of the support irregular to increase the contact surface area between the ink layer and the support as disclosed in Japanese Laid-Open Patent Application 58-16889; and providing an intermediate layer comprising a cellulose resin or polyester resin between the support and the ink layer as disclosed in Japanese Laid-Open Patent Applications 59-165690 and 60-54894.

These methods, however, have the shortcoming that the production cost is high because of the complicated production process.

Furthermore, as mentioned above, in the conventional thermosensitive image transfer recording media, many binder agents for use in the thermofusible ink layers, for example, for use in the thermofusible ink layer in the thermosensitive image transfer recording medium (1) and in the first and second ink layers of the thermosensitive image transfer recording medium (2), comprise as the main component a wax with low plasticity. Therefore, the adhesion strength of such ink layers to the support is so weak that even non-heated ink layer portions, which are not heated by a thermal head, tend to peel off the support in the course of printing serial bar codes by a bar code printer, thereby making printed bar codes significantly unclear. This makes it impossible to read the printed bar codes by a bar code scanner.

Furthermore, the printed bar codes do not have a sufficient abrasion resistance for use in practice. More specifically, it occurs very frequently that the printed bar codes become illegible when frictioned, for instance, with a corrugated fiberboard.

SUMMARY OF THE INVENTION

It is therefore an object of the present invention to provide a thermal image transfer recording medium comprising a support and a thermofusible ink layer formed thereon, which is particularly suitable for use as a bar code recording medium, and is improved with respect to the adhesion between the support and the thermofusible ink layer, the preservability at low temperatures, free from the problem of the peeling of non-heated portions of the thermofusible ink layer off the support in the course of printing, and capable of yielding high quality images having high abrasion resistance.

The above object of the present invention is achieved by a thermal image transfer recording medium comprising a support and a thermofusible ink layer formed thereon which comprises as the main components a coloring agent, a wax component and a rubber elastomer component which is discontinuously dispersed in the form of layers in the thermofusible ink layer.

DETAILED DESCRIPTION OF THE PREFERRED EMBODIMENTS

With reference to the accompanying drawings, the present invention will now be explained in more detail.

Figure 1A:
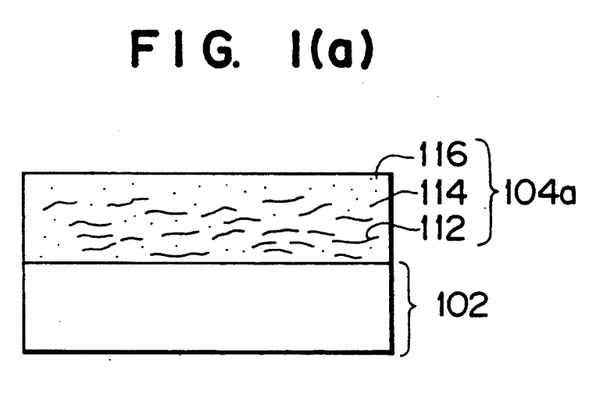
FIG. 1(a) is a schematic cross-sectional view of an example of a thermal image transfer recording medium according to the present invention.

FIG. 1(a) is a schematic cross-sectional view of an example of a thermal image transfer recording medium according to the present invention, which comprises a support 102 and a single ink layer 104a formed thereon. In the figure, reference numeral 112 indicates a rubber elastomer; reference numeral 114, a coloring agent; and reference numeral 116, a thermofusible material.

Figure 1B:
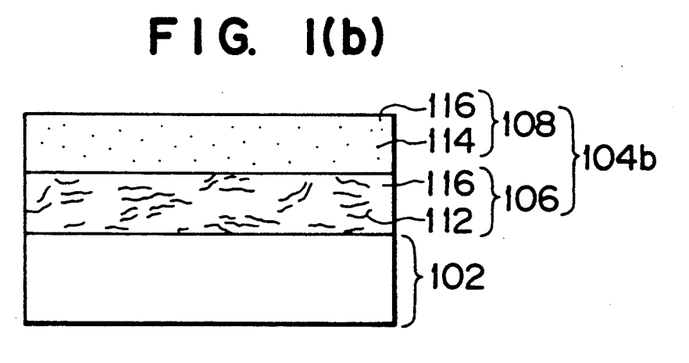
FIG. 1(b) is a schematic cross-sectional view of another example of a thermal image transfer recording medium according to the present invention.

FIG. 1(b) is a schematic cross-sectional view of another example of a thermal image transfer recording medium according to the present invention, which comprises a support 102 and a double-layered ink layer 104b formed thereon. The double-layered ink layer 104b comprises a first ink layer 106 provided on the support 102, and a second ink layer 108 overlaid on the first ink layer 106. In the figure, reference numeral 112 indicates a rubber elastomer; reference numeral 114, a coloring agent; and reference numeral 116, a thermofusible material.

The thermofusible material 116 employed in the single ink layer 104a comprises as the main component a wax component or a wax component and a binder resin.

With respect to the thermofusible material 116 employed in the double-layered ink layer 104b, in particular the thermofusible material 116 in the first ink layer 106 comprises as the main component a wax component, while the thermofusible material 116 in the second ink layer 108 comprises as the main component a binder resin.

As a part of the thermofusible material 116 for use in the first ink layer 106, a binder resin can be used. However, the first ink layer 106 is provided in order to serve as a release layer which facilitates the transfer of the second ink layer 108 to an image-receiving transfer sheet. Therefore it is preferable that the main component of the thermofusible material 116 for use in the first ink layer 106 be a wax component. On the other hand, it is preferable that the thermofusible material 116 for use in the second ink layer 108 comprise as the main components not only a binder resin, but also a wax component.

Figure 2:
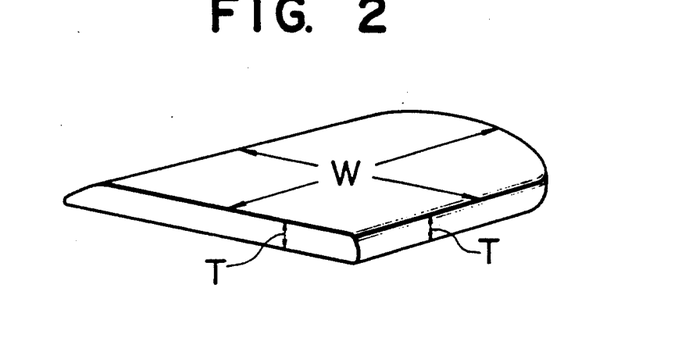
FIG. 2 is a perspective view of a plate-shaped rubber elastomer for explanation of the thickness and width thereof.
Figure 3:
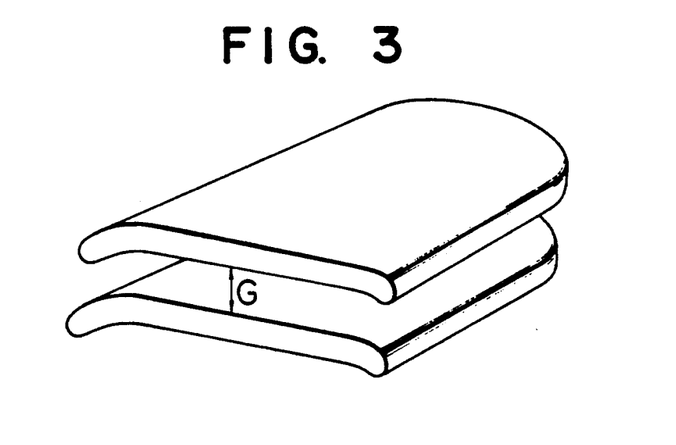
FIG. 3 is a perspective view of superimposed plate-shaped rubber elastomers for explanation of the gap between the plate-shaped rubber elastomers.

One of the key features of the thermal image transfer recording medium of the present invention is that the rubber elastomer 112 is dispersed discontinuously in the form of plate-shaped layers throughout the single ink layer 104 or in the first ink layer 106. It is not necessary that the plate-shaped layers of the rubber elastomer 112 have a specific size and a specific thickness, but it is preferable that each plate-shaped rubber elastomer, which is hereinafter referred to as the plate-shaped rubber elastomer 112', be in the shape as illustrated in FIG. 2, and have a thickness (T) of about 0.02 μm to about 0.5 μm and a width (W) of about 0.20 μm to about 5.5 μm, and that these plate-shaped rubber elastomers 112' be positioned in such a fashion that at least a wax component is interposed between the plate-shaped rubber elastomers 112'. In the case of the rubber elastomer 112 employed in the single ink layer 104, there is the possibility that not only a wax component, but also a coloring agent is partly interposed between the plate-shaped rubber elastomers 112'. When the plate-shaped rubber elastomers 112' are positioned in the form of superimposed layers as illustrated in FIG. 3, it is preferable that the gap (G) between the plate-shaped rubber elastomers 112' be in the range of about 0.01 μm to about 0.4 μm.

Figure 4:
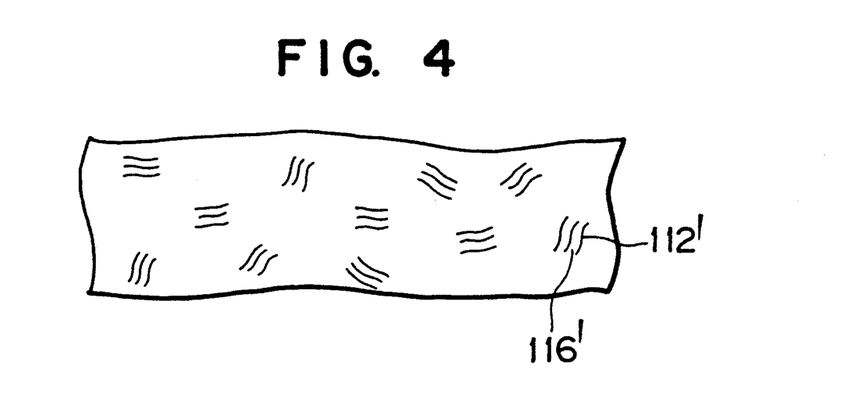
FIG. 4 is a schematic illustration of plate-shaped rubber elastomers which are dispersed discontinuously in the form of superimposed layers in an ink layer.

FIG. 4 schematically shows several rubber elastomers 112 dispersed in an ink layer. Each of these rubber elastomers 112' composed of a plurality of plate-shaped rubber elastomers 112, which are superimposed and between which a wax layer 116' is interposed. Each of the plate-shaped rubber elastomers 112' is not necessarily flat in its entirety, but may be partly or in its entirety bent.

Furthermore, it is not necessary that all the plate-shaped rubber elastomers 112' have the same length, width and thickness. It is common that the plate-shaped rubber elastomers 112' are different in the length, width and thickness.

As will become apparent from examples of the present invention which will be described later, thermally transferred images with high quality can be obtained by dispersing in the ink layer the plate-shaped rubber elastomers 112' in the form of discontinuous superimposed layers.

In order to improve the quality of the thermally transferred images, the inventors of the present invention have discovered that a thermal image transfer recording medium comprising a support and a thermofusible ink layer formed thereon, with the adhesion strength being adjusted to be in the range of 1.5 to 3.5 f/cm under the ambient conditions of 5° C., 10–50% RH, can yield thermally transferred images with higher quality.

Figure 5:
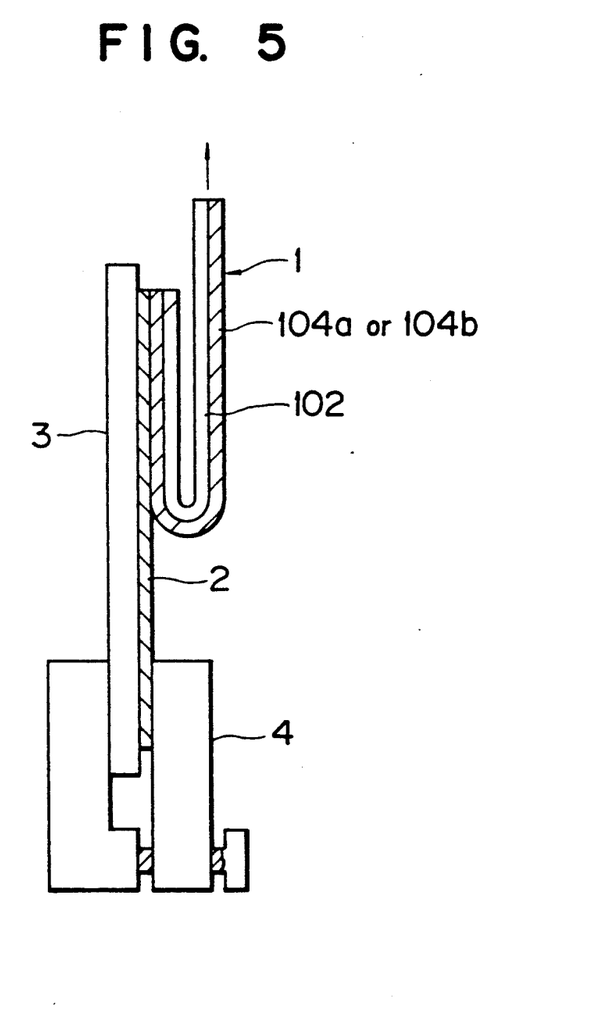
FIG. 5 is a schematic illustration of a tensilon tensile and compression tester.

FIG. 5 is a schematic vertical cross-sectional view of a commercially available tensilon tensile and compression tester (Trademark "TCM-200 CR Type" made by Ninebea Co., Ltd.) for measuring the shearing strength and the adhesion strength of the thermal image transfer recording medium.

In the figure, reference numeral 1 indicates a thermal image transfer recording medium test piece; and reference numeral 2, an adhesive tape (18 mm×35 mm) which is commercially available from Nichiban Co., Ltd. An adhesive layer of the adhesive tape 2 is directed to the ink layer 104a or the ink layer 104b. Reference numeral 102 indicates a support for the ink layer 104a or 104b. Reference numeral 3 indicates a reinforcement plate. In this case, a thick stainless steel plate is employed as the reinforcement plate 3. Reference number 4 indicates a fixing member.

The shearing strength and the adhesion strength were measured by applying the thermal image transfer recording medium 1 to the adhesive tape 2 in such a manner that the ink layer 104a or 104b was in contact with the adhesive layer of the adhesive tape 2, and then by peeling the thermal image transfer recording medium 2 off the adhesive layer 2 under the following conditions:
Peeling Angle: 180°
Peeling Speed: 50 mm/min
Width of the Test Piece: 10 mm
Ambient Temperatures & Hummidities: 5° C., 35% RH, and 20° C., 60% RH The above-mentioned shearing strength is the force applied to the thermal image transfer recording medium 1 when the thermal image transfer recording medium 1 begins to be peeled off the adhesive tape 2 in such a manner that only the ink layer 104a or 104b remains on the adhesive tape 2, and the adhesion strength is the force applied to the thermal image transfer recording medium 1 after the thermal image transfer recording medium 1 has begun to be peeled off the adhesive tape 2 in such a manner that only the ink layer 104a or 104b remains on the adhesive tape 2, and such peeling of the ink layer 104a or 104b is continued.

In the thermal image transfer recording medium according to the present invention, a heat resistant layer and/or a lubricating protective layer may be provided on the back side of the support 102, opposite to the ink layer 104a or 104b, with which a thermal head comes into contact. By proving such a heat resistant layer or a lubricating protective layer on the back side of the support 102, the heat resistant properties and/or lubricating properties of the support 102 can be improved, so that materials which are not conventionally employed for the support 102 can also be employed.

The support 102 can be made of, for example, a film of heat resistant plastic materials such as polyester, polycarbonate, triacetyl cellulose, nylon and polyimide; glassine paper, condenser paper, and metallic foils. It is preferable that the support 102 have a thickness of about 2 to 15 μm, more preferably about 3 to 10 μm.

Examples of the materials for the heat resistant layer or the lubricating protective layer include silicone resin, silicone rubber, silicone-modified resin, fluorine plastics, polyimide resin, epoxy resin, phenolic resin, and nitrocellulose.

The ink layer 104a is a thermofusible layer comprising as the main components a coloring agent, a wax component, and a rubber elastomer, with addition thereto of a binder resin as desired.

As the coloring agent for use in the ink layer 104a, dyes and pigments which are conventionally employed in this field can be employed.

Examples of the wax component include wax-like materials such as paraffin wax, microcystalline wax, oxidized paraffin wax, candelilla wax, carnauba wax, montan wax, cersine wax, polyethylene wax, oxidized polyethylene wax, castor wax, beef tallow hardened oil, lanolin, Japan wax, sorbitan stearate, sorbitan palmitate, stearyl alcohol, oleylamide wax, polyamide, stearylamide, hydroxystearic acid, synthesized ester wax, and synthesized alloy waxes.

It is preferable that these wax components have a penetration of 2 dmm or less at 25° C., 60% RH, which is measured by penetrating a loaded needle into the wax components and hereinafter referred to as the loaded needle penetration. In particular, carnauba wax is most preferable for use in the present invention.

When a binder resin is employed in addition to the above wax components, preferable examples of the binder resin are polyamide resin, polyester resin, polyurethane resin, polyvinyl chloride resin, cellulose-based resin, petroleum resin, polystyrene resin, butyral-based resin, phenolic resin, ethylene - vinylacetate copolymer, and ethylene - acrylic resin.

The rubber elastomer is necessary for imparting to the ink layer 104a or 104b the shearing strength of 25 to 45 gf/cm at 5° C. and the adhesion strength of 1.5 to 3.5 gf/cm.

Examples of the rubber elastomer for use in the present invention include synthesized rubbers such as butadiene rubber, styrene-butadiene rubber, nitrile rubber, nitrile-butadiene rubber, styrene-isoprene rubber, isoprene rubber, acrylic rubber, epichlorohydrin rubber, butyl rubber, and ethylene-propylene rubber; and natural rubbers.

It is preferable that the ratio by weight of the coloring agent/the wax component/the binder resin/the rubber elastomer in the ink layer 104a be approximately 5 to 50/30 to 90/5 to 50/3 to 30.

The ink layer 104a may further contain conventional plasticizers and oils such as fatty acid esters, glycol esters, phosphoric esters, epoxidized linseed oil, if in a small amount of 30wt. % or less.

The ink layer 104a can be formed on the support 102 by coating a solution or dispersion of the above components, or a hot-melted mixture of the components on the support 102 and drying the solution or dispersion or the hot-melted mixture.

It is preferable that the ink layer 104a shown in FIG. 1(a) have a thickness of 1 to 10 μm, more preferably a thickness of 2 to 6 μm. When the ink layer 104a has a thickness of less than 1 μm, the density of the printed images tends to be decreased, and non-printed portions tend to appear when printed on a paper with a low surface smoothness, while when the thickness is more than 10 μm, the adhesion strength tends to be decreased so that the ink layer tends to be peeled off the support, and at the same time, the shearing strength increases so that improper image transfer is apt to occur.

Next, the double-layered ink layer 104b comprising a first ink layer 106 and a second ink layer 108 which is overlaid on the first ink layer 106 will now be explained with reference to FIG. 1(b).

As mentioned previously, the first ink layer 106 comprises as the main components a wax component serving as the thermofusible material 116 and a rubber elastomer 112 which is discontinuously dispersed in the form of overlaid layers throughout the first ink layer 106.

Examples of the wax component for use in the first ink layer 106 include wax-like materials having a melting point of 40° to 100° C., such as paraffin wax, microcystalline wax, oxidized paraffin wax, candelilla wax, carnauba wax, montan wax, cersine wax, polyethylene wax, oxidized polyethylene wax, castor wax, beef tallow hardened oil, lanolin, Japan wax, sorbitan stearate, sorbitan palmitate, stearyl alcohol, polyamide wax, oleylamide, stearylamide, hydroxystearic acid, synthesized ester wax, and synthesized alloy waxes.

Of the above wax components, preferable are those having a loaded needle penetration of 2 dmm or less at 25° C., 60% RH. This is because by use of such a wax component having a relatively high hardness as mentioned above, the abrasion resistance of the surface of the printed images can be improved and highly reliable bar codes can be produced which last for an extended period of time. In this respect, carnauba wax is most preferable for use in the first ink layer 106.

The same rubber elastomer 112 and wax component as employed in the ink layer 104a can be employed in the ink layer 106. It is preferable that such a rubber elastomer be employed in the ink layer 106 in such a manner that a shearing strength of 25 to 45 gf/cm at 5° C. and an adhesion strength of 1.5 to 3.5 gf/cm are imparted to the combination of the first ink layer 106 and the second ink layer 108.

When the shearing strength is less than 25 gf/cm at 5° C. and the adhesion strength is less than 1.5 gf/cm, the peeling of the ink layer 104b tends to occur at a low temperature, for example, at 5° C., and when a serial bar code is printed by a bar code printer, not only heated portions, but also non-heated portions are transferred from the thermal image transfer recording medium to a transfer sheet even at room temperature (20° to 25° C., so that the printed bar codes cannot be read by a bar code scanner.

When the shearing strength is more than 45 gf/cm at 5° C. and the adhesion strength is more than 3.5 gf/cm, the adhesion of the ink layer 104b to the support 102 tends to become greater than the adhesion of the ink layer 104b to a transfer sheet, so that improper image transfer tends to occur.

It is preferable that the ratio by weight of the wax component/the rubber elastomer in the first ink layer 106 be approximately 95 to 75/5 to 25.

The first ink layer 106 may further comprises one of the following components, or a mixture of at least one of the following components: polyvinyl butyral, vinyl chloride-vinyl acetate copolymer resin, nitrocellulose, epoxy resin, ethylene-vinyl acetate copolymer resin, ethylene-α-olefin copolymer resin, α-olefin-maleic anhydride copolymer resin, ethylene-methacrylic acid copolymer resin, and ethylcellulose.

It is preferable that the first ink layer 106 shown in FIG. 1(b) have a thickness of 0.5 to 10 μm, more preferably a thickness of 1 to 3 μm. When the first ink layer 106 has a thickness of less than 0.5 μm, the function as a release layer of the first ink layer 106 tends to decrease, so that the transfer of images to a transfer sheet with a low surface smoothness is poor, while when the thickness is more than 10 μm, the adhesion strength tends to be decreased so that the ink layer tends to be peeled off the support at low temperatures (5° to 10° C.), and at the same time, the shearing strength increases so that improper image transfer is apt to occur.

The abrasion resistance of the printed images can be improved by use in both the first and second ink layers 106 and 108 of the same wax components as employed in the ink layer 104a. The second ink layer 108 for use in the present invention comprises as the main components a coloring agent, a wax component and a binder resin. It is preferable that the second ink layer 108 have a thickness of 0.5 to 4 μm, more preferably a thickness of 1 to 3 μm. It is also preferable that the ratio by weight of a coloring agent to a binder resin in the second ink layer 108 (a coloring agent:a binder resin) be approximately 5:95 to 20:80.

The features of the present invention will become apparent in the course of the following description of exemplary embodiments which are given for illustration of the invention and are not intended to be limiting thereof.

EXAMPLE 1

Preparation of Ink Layer Coating Liquid

The following components were thoroughly fused with application of heat thereto and then dispersed in a ball mill at room temperature for 12 hours to prepare a dispersion:

|  | Parts by Weight |
| --- | --- |
| Carnauba wax | 60 |
| Candelilla wax | 13 |
| Carbon black (Trademark "MA-7" made by Mitsubishi Chemical Industries, Ltd.) | 15 |
| Toluene | 492 |
| Methy isobuty ketone | 180 |

To the above dispersion were added 240 parts by weight of a 5% toluene solution of polybutadiene rubber. The mixture was dispersed, so that an ink layer coating liquid was prepared.

Preparation of Thermal Image Transfer Recording Medium No. 1

The thus prepared ink layer coating liquid was coated by a wire bar on an about 5.5 μm thick polyethylene terephthalate film (hereinafter referred to as a PET film), and dried, so that an ink layer with a thickness of about 3.5 μm was formed on the PET film. Thus, a thermal image transfer recording medium No. 1 according to the present invention was prepared.

EXAMPLE 2

Preparation of First Ink Layer Coating Liquid

The following components were thoroughly fused with application of heat thereto and then dispersed in a ball mill at room temperature for 12 hours to prepare a dispersion:

|  | Parts by Weight |
| --- | --- |
| Carnauba wax | 88 |
| Toluene | 492 |
| Methy isobutyl ketone | 180 |

To the above dispersion were added 240 parts by weight of a 5% toluene solution of polybutadiene rubber. The mixture was dispersed, so that a first ink layer coating liquid was prepared.

Formation of First Ink Layer

The above prepared first ink layer coating liquid was coated on an about 5.5 μm thick PET film by a wire bar, and dried at 55° C., so that a first ink layer with a thickness of about 1.5 μm was formed on the PET film.

Preparation of Second Ink Layer Coating Liquid

The following components were dispersed in a ball mill at room temperature for 12 hours to prepare a second ink layer coating liquid:

|  | Parts by Weight |
| --- | --- |
| Aqueous dispersion of carnauba wax (Solid component: 30 wt. %) | 183 |
| Aqueous dispersion of candelilla wax (Solid component: 30 wt. %) | 67 |
| Aqueous dispersion of ethylene - vinylacetate copolymer (Solid component: 30 wt. %) | 33 |
| Aqueous dispersion of carbon wax (Solid component: 20 wt. %) | 75 |
| Surface active agent (Trademark "Leodol TW-S120" made by Kao Atlas Co., Ltd.) | 1 |
| Water | 61 |
| Methanol | 80 |

Formation of Second Ink Layer

The above prepared second ink layer coating liquid was coated on the above first ink layer by a wire bar, and dried at 70° C., so that a second ink layer with a thickness of about 2 μm was formed on the first ink layer.

Thus, a thermal image transfer recording medium No. 2 according to the present invention was prepared.

Figure 6:
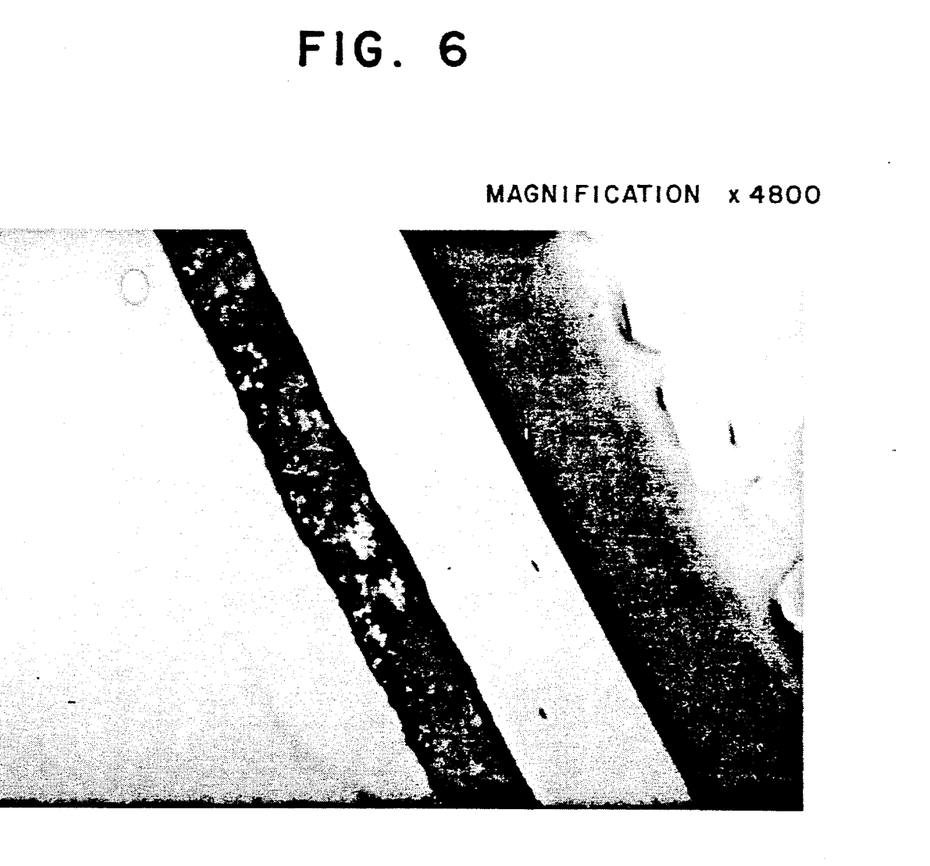
FIG. 6 is an electron-microscopic photograph showing a cross section of an ink layer in Example 2.

FIG. 6 is a transmission type electron microscopic photograph of a cross section of the thermal image transfer recording medium No. 2. This photograph shows the rubber elastomers in the form of overlaid layers, which are discontinously dispersed in the first ink layer.

EXAMPLE 3

The procedure for Example 2 was repeated except that the first ink layer coating liquid employed in Example 2 was replaced by the following first ink layer coating liquid, which was prepared as follows, whereby a thermal image transfer recording medium No. 3 according to the present invention was prepared.

Preparation of First Ink Layer Coating Liquid

The following components were thoroughly fused with application of heat thereto and then dispersed in a ball mill at room temperature for 12 hours to prepare a dispersion:

|  | Parts by Weight |
| --- | --- |
| Carnauba wax | 70 |
| Paraffin wax (Trademark "HNP-16" made by Nippon Seiro Co., Ltd.) | 19 |
| Toluene | 511 |
| Methy isobutyl ketone | 180 |

To the above dispersion were added 160 parts by weight of a 5% toluene solution of polybutadiene rubber and 60 parts by weight of a 5% toluene solution of styrene-butadiene rubber. The mixture was dispersed, so that the first ink layer coating liquid was prepared.

EXAMPLE 4

The procedure for Example 2 was repeated except that the first ink layer coating liquid employed in Example 2 was replaced by the following first ink layer coating liquid, which was prepared as follows, whereby a thermal image transfer recording medium No. 4 according to the present invention was prepared.

Preparation of First Ink Layer Coating Liquid

The following components were thoroughly fused with application of heat thereto and then dispersed in a ball mill at room temperature for 12 hours to prepare a dispersion:

|  | Parts by Weight |
| --- | --- |
| Carnauba wax | 70 |
| Montan wax (Trademark "Hoechst-Wax KP" commercially available from Hoechst) | 17 |
| 5% toluene solution of polystyrene resin | 60 |
| Toluene | 568 |
| Methy isobutyl ketone | 180 |

To the above dispersion were added 5 parts by weight of a 5% toluene solution of polybutadiene rubber (Trademark "Higol BR 1220" made by Nippon Zeon Co., Ltd.) and 100 parts by weight of a 5% toluene solution of acrylonitrile-butadiene rubber (Trademark "JSR N234L" made by Japan Synthetic Rubber Co., Ltd.). The mixture was dispersed, so that the first ink layer coating liquid was prepared.

COMPARATIVE EXAMPLE 1

The procedure for Example 2 was repeated except that the first ink layer coating liquid employed in Example 2 was replaced by the following first ink layer coating liquid, which was prepared as follows, whereby a comparative thermal image transfer recording medium No. 1 was prepared.

Preparation of First Ink Layer Coating Liquid

The following components were thoroughly fused with application of heat thereto and then dispersed in a ball mill at room temperature for 12 hours to prepare the first ink layer coating liquid:

|  | Parts by Weight |
| --- | --- |
| Carnauba wax | 73 |
| Candelilla wax | 15 |
| Polybutadiene rubber (Trademark "JSR BR 31" made by Japan Synthetic Rubber Co., Ltd.) | 2 |
| Ethylene - vinyl acetate copolymer (Trademark "Eva Flex 210" made by Du Pont-Mitsui Polychemicals Co., Ltd.) | 10 |
| Toluene | 900 |

COMPARATIVE EXAMPLE 2

The procedure for Example 2 was repeated except that the first ink layer coating liquid employed in Example 2 was replaced by the following first ink layer coating liquid, which was prepared as follows, whereby a comparative thermal image transfer recording medium No. 2 was prepared.

Preparation of First Ink Layer Coating Liquid

The following components were thoroughly fused with application of heat thereto and then dispersed in a ball mill at room temperature for 12 hours to prepare the first ink layer coating liquid:

|  | Parts by Weight |
| --- | --- |
| Carnauba wax | 55 |
| Candelilla wax | 20 |
| Polybutadiene rubber (Trademark "JSR BR 31" made by Japan Synthetic Rubber Co., Ltd.) | 15 |
| Styrene-butadiene rubber (Trademark "JSR BR 1712" made by Japan Synthetic Rubber Co., Ltd.) | 10 |
| Toluene | 900 |

COMPARATIVE EXAMPLE 3

The procedure for Example 2 was repeated except that the first ink layer coating liquid employed in Example 2 was replaced by the following first ink layer coating liquid, which was prepared as follows, whereby a comparative thermal image transfer recording medium No. 3 was prepared.

Preparation of First Ink Layer Coating Liquid

The following components were thoroughly fused with application of heat thereto and then dispersed in a ball mill at room temperature for 12 hours to prepare the first ink layer coating liquid:

| | Parts by Weight |
|---|---|
| Paraffin wax (m.p. 155° F.) | 75 |
| Polybutadiene rubber (Trademark "JSR BR 31" made by Japan Synthetic Rubber Co., Ltd.) | 15 |
| Styrene-butadiene rubber (Trademark "JSR BR 1712" made by Japan Synthetic Rubber Co., Ltd.) | 10 |
| Toluene | 900 |

COMPARATIVE EXAMPLE 4

The procedure for Example 1 was repeated except that the ink layer coating liquid employed in Example 1 was replaced by the following dispersion which was prepared by subjecting the following components to hot-melt dispersion and an ink layer with a thickness of about 2.6 μm was formed by hot-melt flexography.

| | Parts by Weight |
|---|---|
| Carnauba wax | 12.0 |
| Paraffin wax (m.p. 155° F.) | 60.0 |
| Ethylene - vinyl acetate copolymer (Trademark "Eva Flex 210" made by Du Pont-Mitsui Polychemicals Co., Ltd.) | 12.0 |
| Carbon black (Trademark "MA-7" made by Mitsubishi Chemical Industries, Ltd.) | 15.0 |
| Mineral oil | 1.0 |

Thus, a comparative thermal image transfer recording medium No. 4 was prepared.

Figure 7:
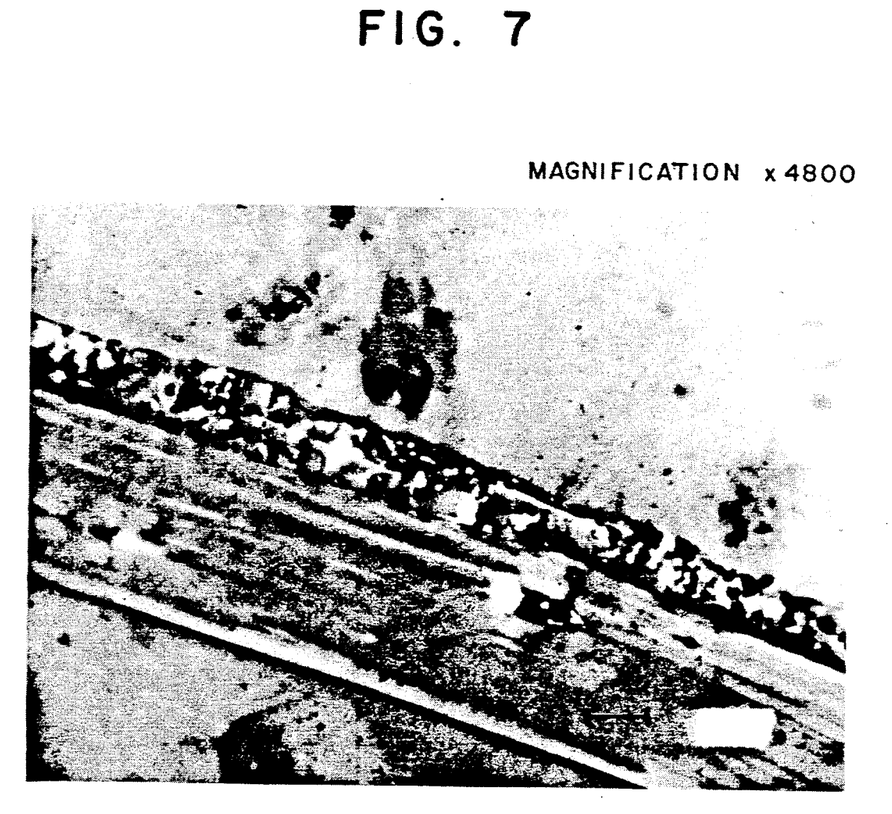
FIG. 7 is an electron-microscopic photograph showing a cross section of an ink layer in Comparative Example 4.

FIG. 7 is a transmission type electron microscopic photograph of a cross section of the comparative thermal image transfer recording medium No. 4. This photograph shows that the resin component and wax components are in a single uniformly connected phase.

COMPARATIVE EXAMPLE 5

The procedure for Example 1 was repeated except that the ink layer coating liquid employed in Example 1 was replaced by the following ink layer coating liquid which was prepared by thoroughly fusing the following components with application of heat and dispersing the mixture in a ball mill at room temperature for 12 hours:

| | Parts by Weight |
|---|---|
| Carnauba wax | 60 |
| Candelilla wax | 13 |
| 5% toluene solution of polybutadiene rubber (Trademark "JSR BR 31" made by Japan Synthetic Rubber Co., Ltd.) | 240 |
| Carbon black (Trademark "MA-7" made by Mitsubishi Chemical Industries, Ltd.) | 15 |
| Toluene | 492 |
| Methyl isobutyl ketone | 180 |

Thus, a comparative thermal image transfer recording medium No. 5 was prepared.

COMPARATIVE EXAMPLE 6

The procedure for Example 1 was repeated except that the rubber component (polybutadiene) was eliminated from the formulation of the ink layer coating liquid, whereby a comparative thermal image transfer recording medium No. 6 was prepared.

Bar code printing was conducted on a commercially available light-coated paper (Trademark "New Age 55" made by Kanzaki Paper Manufacturing Co., Ltd.) by use of each of the above prepared thermal image transfer recording media and a commercially available thermal image transfer printer for bar code (Trademark "B-65" made by TEC Co., Ltd.) with application of a standard thermal energy under the conditions of 5° C., 35% RH. The results are shown in the following Table:

| Number | Shearing Strength (g/cm) | Adhesion Strength (g/cm) | Performance of Image | Occurrence of Peeling of Ink Layer | Serial Bar Code Readable Ratio (%) | Abrasion Resistance |
|---|---|---|---|---|---|---|
| Example 1 | 38 | 2.4 | o | None | 100 | 78% |
| Example 2 | 41 | 2.5 | o | None | 100 | 96% |
| Example 3 | 26 | 2.2 | o | None | 100 | 84% |
| Example 4 | 37 | 2.3 | o | None | 100 | 91% |
| Comparative Example 1 | 10 | 1.4 | o | Occurred | 0 | 87% |
| Comparative Example 2 | 82 | 3.9 | x | None | 47 | 54% |
| Comparative Example 3 | 76 | 4.3 | x | None | 12 | 0% |
| Comparative Example 4 | 122 | 1.1 | x | Occurred | 36 | 6% |
| Comparative Example 5 | 64 | 4.0 | x | None | 19 | 73% |
| Comparative Example 6 | 23 | 0.2 | x | Occurred | 0 | 69% |

In the above table, the performance of image transfer was evaluated by visual inspection of the clearness of the printed bar codes. ○ indicates that the printed bar code is clear; and × indicates the printed bar code is not clear and there are some unprinted portions in the bar code.

Serial bar code readable ratio was measured by scanning a laser beam over the printed bar code 100 times by a laser beam check LC-2811 (made by Symbol Technologies, Inc.) and counting the times at which the bar code can be correctly read. The ratio is shown by percentage. For instance, when the result is 100%, the printed bar code is perfect and clear.

The abrasion resistance was measured by rubbing the printed bar code with a piece of corrugated board 100 times, with application of a pressure of 80 g/cm² at 50°

C., and then by measuring the serial bar code readable ratio of the rubbed printed bar code.

The results shown in the above Table indicate that any of the thermal image transfer recording media No. 1 to No. 4 according to the present invention is excellent in the performance of image transfer and is capable of yielding printed bar codes with 100% bar code readable ratio.

The thermal image transfer recording media according to the present invention are significantly improved with respect to (i) the preservability when not used, particularly at low temperatures, and (ii) the printing capability of printing clear serial bar codes, without the problem of the peeling of the ink layer off the support, by setting the shearing strength of the ink layer or the combination of the first ink layer serving as a release layer and the second ink layer in the range of 25 to 45 gf/cm and the adhesion strength thereof in the range of 1.5 to 3.5 gf/cm.

What is claimed is:

1. A thermal image transfer recording medium comprising:
   a support, and
   a thermofusible ink layer formed on said support, comprising as the main components a coloring agent, a wax component, and a rubber elastomer which is dispersed in the form of multiple layers in said ink layer.

2. A thermal image transfer recording medium comprising:
   a support; and
   a thermofusible ink layer comprising a first ink layer which is disposed on said support, and a second ink layer formed on said first ink layer, said first ink layer comprising as the main components a wax component and a rubber elastomer which is dispersed in the form of multiple layers in said first ink layer, and said second ink layer comprising as the main components a coloring agent, a wax component and a binder resin.

3. The thermal image transfer recording medium as claimed in claim 1, wherein the proportion by weight of said coloring agent/said wax component/said binder resin/said rubber elastomer in said thermofusible ink layer is in the range of 5 to 50/30 to 90/5 to 50/3 to 30, respectively.

4. The thermal image transfer recording medium as claimed in claim 1, further comprising an overcoat layer which is provided on said thermofusible ink layer.

5. The thermal image transfer recording medium as claimed in claim 2, further comprising an overcoat layer which is provided on said second ink layer.

6. The thermal image transfer recording medium as claimed in claim 1, further comprising a lubricating protective layer on the back side of said support, opposite to said thermofusible ink layer.

7. The thermal image transfer recording medium as claimed in claim 2, further comprising a lubricating protective layer on the back side of said support, opposite to said first ink layer.

8. The thermal image transfer recording medium as claimed in claim 1, wherein said thermofusible ink layer has a shearing strength of 25 to 45 gf/cm and an adhesion strength of 1.5 to 3.5 gf/cm at 5° C., 35% RH.

9. The thermal image transfer recording medium as claimed in claim 2, wherein said thermofusible ink layer comprising said first ink layer and said second ink layer has a shearing strength of 25 to 45 gf/cm and an adhesion strength of 1.5 to 3.5 gf/cm at 5° C., 35% RH.

10. The thermal image transfer recording medium as claimed in claim 1, wherein said wax component has a loaded needle penetration of 2 dmm or less at 25° C., 60% RH.

11. The thermal image transfer recording medium as claimed in claim 2, wherein said wax component has a loaded needle penetration of 2 dmm or less at 25° C., 60% RH.

12. The thermal image transfer recording medium as claimed in claim 10, wherein said wax component is carnauba wax.

13. The thermal image transfer recording medium as claimed in claim 11, wherein said wax component is carnauba wax.

14. A thermal image transfer recording medium comprising:
    a support, and
    a thermofusible ink layer formed on said support, comprising, as the main components, a coloring agent, a wax component, a binder resin and a rubber elastomer which is dispersed in the form of multiple layers in said ink layer.

15. A thermal image transfer recording medium as claimed in claim 1 wherein said rubber elastomer multiple layers are plate-shaped and have a thickness of about 0.02 μm to about 0.5 μm and a width of about 0.2 μm to about 5.5 μm.

16. A thermal image transfer recording medium as claimed in claim 2 wherein said rubber elastomer multiple layers are plate-shaped and have a thickness of about 0.02 μm to about 0.5 μm and a width of about 0.2 μm to about 5.5 μm.

* * * * *

UNITED STATES PATENT AND TRADEMARK OFFICE
CERTIFICATE OF CORRECTION

PATENT NO. : 5,229,189
DATED : July 20, 1993
INVENTOR(S) : Yoshihiko Hiyoshi, et al It is certified that error appears in the above-indentified patent and that said Letters Patent is hereby corrected as shown below:

Column 4, Line 60, "Hummidities" should read --Humidities--

Column 5, Line 37, "microcystalline wax" should read --microcrystalline wax--

Column 6, Line 37-38, "microcystalline wax" should read --microcrystalline wax--

Column 7, Line 13, "may further comprises" should read --may further comprise--

Column 13, Line 44, "in claim 1" should read --in claim 15--

Signed and Sealed this

Twenty-ninth Day of November, 1994

Attest:

BRUCE LEHMAN

*Attesting Officer*   *Commissioner of Patents and Trademarks*